United States Patent [19]

Scherrinsky

[11] Patent Number: 4,807,389

[45] Date of Patent: Feb. 28, 1989

[54] SETTING TOOL FOR ANIMAL TRAPS

[76] Inventor: Elmer D. Scherrinsky, R.R. #1, Box 308, Greenup, Ill. 62428

[21] Appl. No.: 112,542

[22] Filed: Oct. 26, 1987

[51] Int. Cl.⁴ ............................................. A01M 23/28
[52] U.S. Cl. ......................................................... 43/97
[58] Field of Search ............................................ 43/97

[56] References Cited

U.S. PATENT DOCUMENTS 1,011,102  12/1911  Allen et al. ............................. 43/97
2,494,567   1/1950  Lines ...................................... 43/97

Primary Examiner—M. Jordan

Attorney, Agent, or Firm—Richard G. Heywood

[57] ABSTRACT

A setting tool for animal traps having a pair of jaws acted on by spring-loaded actuating levers, in which the setting tool includes a trap orienting base, a pair of cam arms having adjacent ends pivotally connected together on the base and extending outwardly therefrom, a pair of cam hook members rigidly connected to the outer ends of the cam arms to extend upwardly in an angular relationship and having actuating lever engaging means on the upper end thereof, and a pair of handles rigidly connected to the cam arms intermediate to the ends thereof.

18 Claims, 2 Drawing Sheets

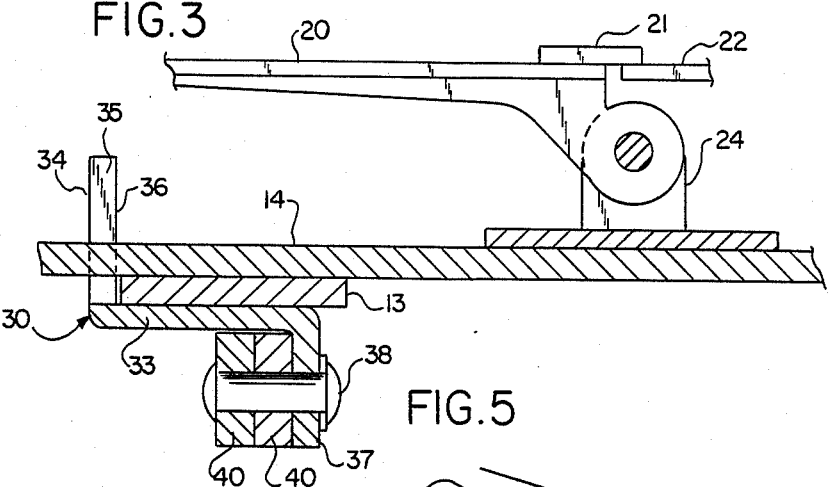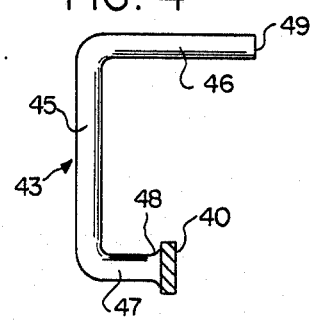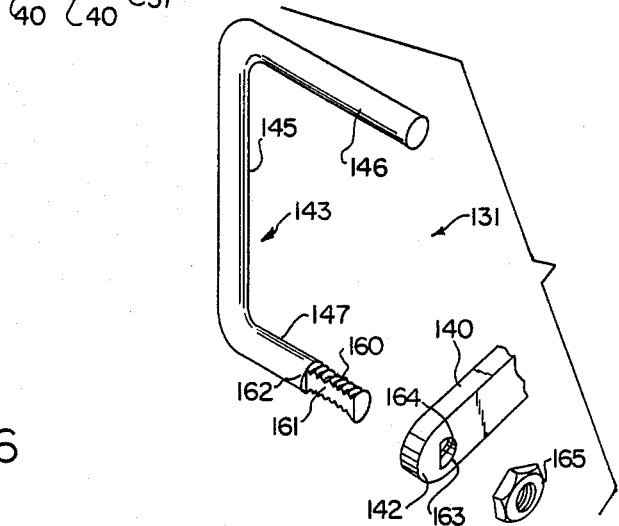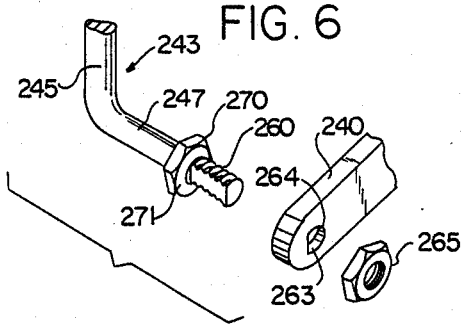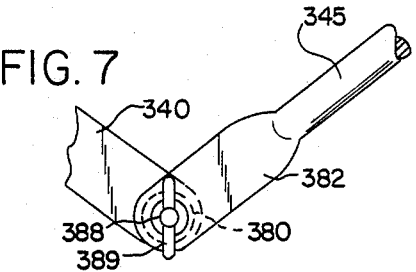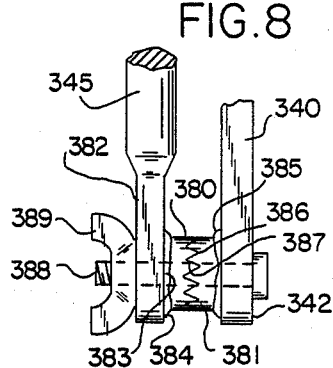

SETTING TOOL FOR ANIMAL TRAPS

BACKGROUND OF THE INVENTION

The present invention relates generally to the animal trapping art, and particularly to a setting tool for use with animal traps having spring-loaded jaws.

Conventional animal traps of the double coil-spring type have a pair of jaws pivoted to a base frame and which are set for action or locked in an open set position by engaging a pivoted latch bar with a trigger bar carried on a trip plate or pan. When sprung or released by an animal, the double coil springs act on jaw camming actuator levers, which snap the jaws upwardly to a closed position to ensnare and hold the animal. As known, the coil springs acting on the jaw levers are relatively strong to hold the trap jaws in closed, animal gripping position, and these springs are further loaded in depressing the jaw levers to enable the trap to be set. It should also be recognized that animal traps are made in a range of sizes for use in trapping different animals.

In the past trappers have traditionally set such animal traps by standing on or otherwise depressing the jaw levers to release their camming action and enable the jaws to be freely moved to their open set position with the latch bar extending over one jaw and thus being frictionally held under the trigger bar of the trip plate by the force of the springs acting upwardly through the jaw actuating levers on the jaws.

Although a number of trap setting tools have been designed for setting single and double coil spring traps, none has been satisfactory for various reasons. For instance, Lines U.S. Pat. No. 2,494,567 shows a trap setting tool U-shaped wire frames to engage the trap jaw levers, which frames are pivotally carried on curved levers in turn pivoted at spaced points on depending legs carried by a base frame that underlies the trap, and the operating handles are connected to the curved levers inwardly of both pivot points. In the commercial form of the Lines '567 construction, a different setting tool is required for each size of animal trap, and operation thereof is difficult in orienting the base on a trap, applying the free swinging wire frame hoops over the jaw levers, and gripping the oppositely extending handles. Furthermore, the wire frames snag or hang up on the pivot points of the jaws in the base frame and interfere with the tool setting action.

SUMMARY OF THE INVENTION

The invention is embodied in trap setting tool having a trap orienting base, a pair of operating cam arms having adjacent ends pivotally connected together on the base, a pair of cam hooks connected to the outer ends of the arms to extend in an angular relationship thereto, the cam hooks including jaw lever engaging means on the upper ends thereof, and a pair of handles are rigidly connected to the cam arms intermediate to the ends thereof.

The principal object of the present invention is to provide a trap setting tool that will positively engage the jaw actuating levers of an animal trap and compress the coil springs acting thereon for setting the animal trap in an efficient manner.

Another object is to provide a trap setting tool having adjustable and/or replaceable cam hooks to permit setting traps of different sizes.

Another object is to provide a trap setting tool that is highly efficient and fast in operation, and which is simple in construction, light weight and economical.

These and still other objects and advantages will become more apparent hereinafter.

BRIEF DESCRIPTION OF THE DRAWINGS

In the accompanying drawings which illustrate preferred embodiments of the invention, and wherein like numerals refer to like parts wherever they occur:

FIG. 3 is a cross-sectional view taken substantially along line 3—3 of FIG. 2;

FIG. 4 is a view taken substantially along line 4—4 of FIG. 2;

FIG. 5 is an exploded fragmentary perspective view showing one modification to the trap setting tool;

FIG. 6 is a partial view showing another modification;

FIG. 7 is a fragmentary view showing a third modification of the setting tool; and FIG. 8 is a view taken substantially along line 8—8 of FIG. 7.

DISCLOSURE OF THE PREFERRED EMBODIMENTS

Figure 1:
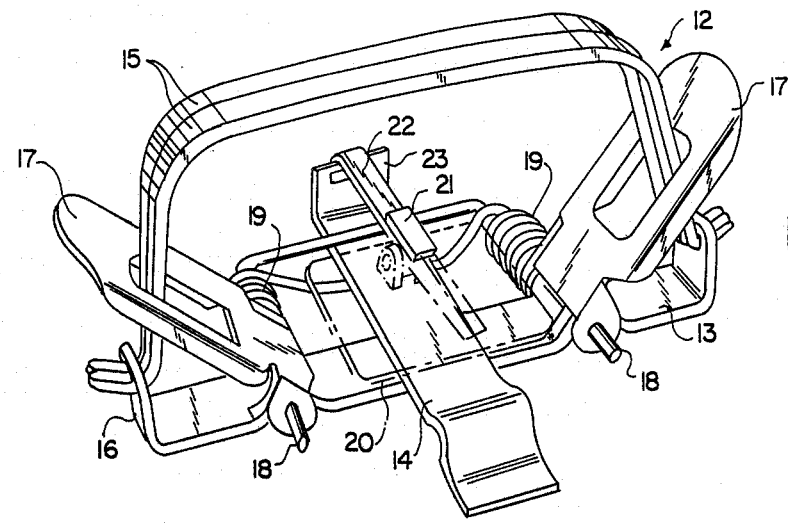
FIG. 1 is a perspective view of a typical double coil-spring animal trap shown for environmental purposes and in inoperative unset condition.

The invention is embodied in a setting tool 10 for setting animal traps, especially of the double coil-spring type. Referring first to FIG. 1 wherein a typical animal trap 12 is illustrated for environmental purposes, the trap includes a base frame having a longitudinal frame member 13 and a transversely crossed frame member 14, and a pair of trap jaws 15 are pivotally mounted in the usual way in upturned end flanges 16 of the base frame 13. The jaws 15 are acted on by a pair of actuator lever plates 17 pivoted, at 18, to the base frame 13 and biased upwardly away from this frame member to a jaw closing position by coil springs 19 having ends engaged beneath the cross frame member 14 and the actuator plates 17. A trip plate or pan 20 is hinged, at 24, to the cross frame 14 and has a trigger bar 21 engageable by a latch bar 22 pivoted on an upturned flange 23 at the end of the cross frame 14. The trap structure 12 is that of an ordinary commercial trap as will be understood by those skilled in the art, and in which the latch bar 22 will be engaged under the projecting trigger 21 of the trip plate 20 and held in frictional contact therewith by the force of the springs 19 acting upwardly through one of the jaws 15 when positioned under the latch bar 22 in its lower, substantially horizontal, open set position. A conventional chain (not shown) is provided to tether the trap 12.

Figure 2:
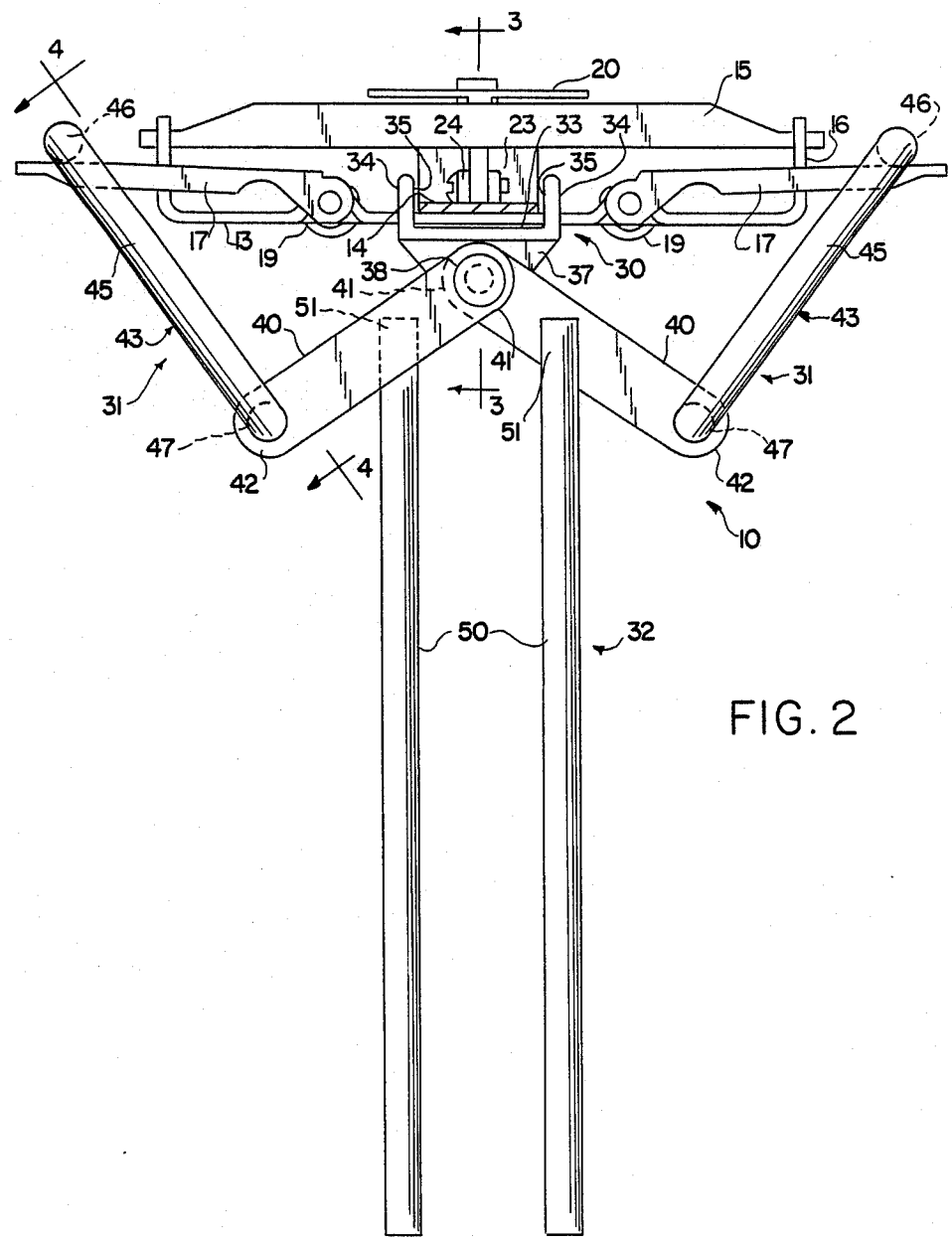
FIG. 2 is a front elevational view showing a setting tool embodying the invention as fully applied in the setting position of a animal trap.

Referring now particularly to FIGS. 2 and 3 of the drawings, the trap setting tool 10 of the present invention is shown in the setting position as when fully applied to depress the actuating levers 17 of the animal trap 12 of FIG. 1 to their lower position. The setting tool 10 comprises a trap orienting base member 30, a pair of cam lever members 13, and a pair of operating handle members 32. The base member 30 is stamped or otherwise formed from a one-piece blank and reversely flanged to include a horizontal main plate or wall 33 for surface engagement against the lower surface of the trap base frame 13, and vertical front flange means in the form of a pair of upstanding spaced ears or tangs 34 are formed on the front edge of the main plate 33 to receive the trap base frame 14 therebetween. The opposed side edges 35 of the ears 34 retain the frame member 14 to centrally orient the trap against lateral displacement, and the rearward surfaces S6 of the ears 34 bear against the front edge of the frame member 13 to orient the base transversely. The base member 30 also includes a rear vertical flange plate or wall 37 depending from the rearward edge of the horizontal wall 33 and forming a central fulcrum for a pivot pin 38 for the pivotal connection of the cam levers 31.

The cam levers 31 include elongated inner cam arm members or links 40 having their adjacent ends 41 pivotally connected together on the pin 38 for hinging action relative to the vertical wall 37 of the base member 30, and the cam levers 31 extend outwardly in opposite directions from this central fulcrum and form unitary left-hand and right-hand lever means for operating the spaced actuator lever plates 17 of the trap 12. For this purpose the cam levers 31 includes outer cam hook members 43 rigidly secured to the outer ends 42 of the cam arms 40 and having a predetermined length and angular connection to the cam arms 40 in order to most efficiently operate a certain sized animal trap, as will appear. As shown best in FIG. 4, the cam hooks 43 are preferably formed of one-piece rod stock bent into a C-shaped configuration and each cam hook 43 has a long, intermediate main leg section 45 with a hook or lever bar 46 of substantial length formed on its outer end and extending at substantially right angles thereto. The lever bars 46 have free outer ends 49. On its inner or lower end, the leg sections 45 are provided with relatively short connection rods or spacer bars 47 which, in the preferred embodiment, have their ends 48 secured in fixed relationship to the cam arms 40 as by welding (48). These short rod spacers 47 provide a transversely offset spaced relationship of the main leg sections 45 relative to the cam arms 40 and base member 30 to provide clearance of movement of the entire cam levers 31 below and on the side of the trap 12 during operation.

The handle members 32 comprise elongated rod-like shanks or bars 50 of suitable cross-sectional configuration, having their upper ends 51 secured in fixed relation to the cam arms 40, as by welding at a predetermined point intermediate their ends (41,42) and being oriented to extend at a predetermined angle to the longitudinal direction of these cam arms 40. The handle members 32 are of substantial length to provide the leverage necessary to overcome the force of the trap springs 19 in operating the setting tool 10, as will be described. It will be noted that the upper ends 51 of the handles 32 are secured on opposite sides of the left-hand and right-hand cam arms 40 to provide optimum lateral alignment for operation.

In operation, the animal trap 12 is grasped by the jaws 15 in their closed, substantially vertical unset position by one hand, and the setting tool 10 is oriented on the trap by engaging the horizontal plate 33 beneath the juncture of the trap cross frame members 13,14 with the upstanding ears or lugs 34 spanning the frame member 14. In this position, the cam arms 40 of the lever members 31 extend laterally outwardly in a substantially straight line, and the leg sections 45 of the cam hooks 43 are angularly upwardly disposed so that the hook bars 46 extend across the top of the jaw actuator plates 17 at their juncture with the trap jaws 15. The handle members 32 diverge from the cam arms 40 and are grasped and pulled together to act on the cam arms 40 intermediate to their ends (41,42). The cam levers 31 are thus pivoted as a unit on the common fulcrum pin 38 to draw the cam hooks 43 downwardly against the jaw actuator lever plates 17 thereby compressing the coil springs 19 and releasing all camming action on the trap jaws 15 so they can be freely moved downwardly into their trap setting position. It should be noted that the hooks 43 will slide outwardly on the actuator levers 17 and away from trap jaws 15 during this downward camming action due to the fixed, rigid relationship between the cam arms 40 and cam hook members 43. The angularity of the handle members 32 to the cam arms 40 is such that the actuator levers 17 are fully depressed when the handles 32 are brought together. It will now be apparent that the length of the main leg section 45 and its relative angularity to the cam arm 40 of both the left-hand and right-hand cam lever members 31 precisely locates the hooks 43 for setting engagement with the jaw actuator levers 17 of an animal trap 12 of selected size. Since a feature of the invention is the adaptation of the setting tool 10 for different sized animal traps, modified embodiments of the invention will now be described.

Referring to FIG. 5 showing one modification of the setting tool for converting it for use with different sized traps, cam hook members 143 having leg sections 145 of different lengths are interchangeably connected to the outer ends 142 of the cam arms 140 at different angles. As shown, the cam hook members (43,143) are preferably formed from rod stock having a circular cross-section although other shapes, such as square or hexagonal rod stock, may be used. In the preferred form, the connection rod spacer 147 of each cam hook 143 has a threaded end portion 160 that is interrupted by a flat side wall surface 161 at a predetermined circumferential position. The flat side wall 161 extends from the free outer end of the connection rod 147 longitudinally toward the leg section 145 and forms an abutment shoulder 162 at its inner end. The cam arm 142 has an opening 163 complementary to the cross-sectional configuration of the connection rod 147 at its threaded outer end 160, which includes a flat chordline edge 164. Thus, on each of the left-hand and right-hand cam levers (131), the flat side wall 161 of the connection rod 147 and the chordline edge 164 serve to "key" the cam hook 143 to the cam arm 142 at a predetermined angle to position the outer hook rod 146 for operative engagement with a trap 12 of specific size.

The cam hook 143 is assembled on the cam arm 142 by inserting the threaded end 160 of the connection arm portion 147 through the opening 164 with the abutment shoulder 162 bearing against the wall surface of the cam arm adjacent to the opening 163 therein. A nut 165 is tightened on the interrupted thread 160 to rigidly secure the cam hook 143 and cam arm 142 together, and the keyed engagement between the side wall 161 and chord edge 164 maintains this rigid assembly by preventing relative rotation.

In the FIG. 5 embodiment, it will be apparent that the setting tool 10 can be converted for use with a different sized trap by removing both the left-hand and right cam hooks 143 from the cam arms 142, and substituting replacement cam hooks (143) having leg sections 145 of a different length. Due to the fact that the actuator plates 17 of different trap sizes will be relatively closer or further away from each, not only the length of the cam hook legs 145 must be different, but the relative angularity between the cam arms 142 and cam hooks 143 must be different. Thus, on a replacement cam hook, the flat side wall surface 161 will be formed along a different longitudinal chordline or radius point on the connection rod circumference that is either higher or lower relative to the leg section 145.

Referring to FIG. 6, another modification of the FIG. 5 embodiment is to provide an inner stop or abutment member 270 in the form of a metal nut or washer 270. This member 270 may be threaded onto the interrupted threaded end 260 of the connection rod 260 against the abutment shoulder (262) and preferably would be brazed or spot welded. In this embodiment, an annular abutment shoulder 271 is formed for engagement against the side wall of the cam arm 240 surrounding the opening 263, but a keyed connection (261,264) is still important to assure against relative rotation due to the torquing forces exerted during operation of the setting tool.

Referring to FIGS. 7 and 8, yet another modification of the setting tool is disclosed. In this embodiment, the connection rod spacer (47,147,247) is replaced by a pair of opposed spacer members 380,381 rigidly secured to the cam hook leg section S45 and the outer end 342 of the cam arm 340, respectively. The end portion 382 of the leg section 345 is flattened to form a mounting surface 383 to which the spacer member 380 is fastened by brazing or spot welding (384) and the opposed spacer 381 is similarly secured to the cam arm 340 by a weld (385) or the like. The opposed free surfaces or ends of the spacers 380,381 are notched with a plurality of radially extending and mating teeth 386,387 to "key" or interlock the spacer members 380,381 together against torsional rotation yet permit angular adjustment between the cam hook-leg section 345 and the cam arm 340 for locating the outer hook rods (46,146) of the left-hand and right-hand cam hooks (343) at the proper spacing for operative engagement with the trap. The cam hook 343 and cam arm 342 are held at any preselected adjusted angle by fastening means, such as bolt 388 and wing nut 389 o the like.

From the foregoing it will be seen that the setting tool of the present invention meets the objects set forth, and that changes and modifications in the disclosed embodiments will be apparent to those skilled in the art. Accordingly, the invention is only limited by the scope of the appended claims.

What is claimed is:

1. A setting tool for animal traps having a pair of jaws movable on a base frame and being acted on by spring-loaded jaw actuating levers biasing said jaws from an open set position toward a closed position, said setting tool comprising a trap orienting base, a pair of elongated cam arms pivotally connected together on said base and extending outwardly therefrom, a pair of cam hook members connected to the outer ends of said cam arms to extend upwardly therefrom, said cam hook members including actuating lever engaging means on the upper ends thereof, and a pair of handle members connected to said cam arms outwardly of their pivotal connection to said base, said pairs of cam arms, cam hook members and handle members being rigidly interconnected together in left-hand and right-hand pairs of unitary lever means.

2. The setting tool according to claim 1, in which said trap orienting base comprises centering means for centrally abutting an animal trap base frame, said centering means including a horizontal wall and a pair of upstanding spaced ears for retaining said trap orienting base against lateral displacement from its central abutment, and vertical flange means on said trap orienting base forming a central fulcrum for pivotally mounting said cam arms.

3. The setting tool according to claim 2, in which said spaced ears extend upwardly from the front edge of said horizontal wall, and said flange means extend downwardly from the rear edge of said horizontal wall.

4. The setting tool according to claim 1, in which said trap orienting base includes a single depending vertical flange forming a central fulcrum, said cam arms having inner adjacent ends pivotally mounted together on said flange, and said handle members being connected at a predetermined angle to said can arms intermediate to said inner adjacent ends and said outer ends thereof.

5. The setting tool according to claim 1, in which said cam hook members include elongated leg sections extending at predetermined angles to said elongated cam arms, and spacer means for connecting said leg sections to the outer ends of said cam arms to provide a transversely offset relationship therebetween.

6. The setting tool according to claim 5, in which said spacer means of each cam hook member is removably connected to its respective cam arm and comprises a connection rod on each cam hook member having a free end portion and a complementary opening formed in the outer end of said cam arm, keying means between said free end portion and said opening to prevent relative rotation, and fastening means for securing said free end portion to said cam arm.

7. The setting tool according to claim 6, in which said free end portion has a flat area for abutting engagement with a complementary flat edge margin of said opening, and said fastening means comprises threaded connection means on said free end portion interrupted by said flat area and a threaded nut for releasably securing said connection rod to said cam arm.

8. The setting tool according to claim 1, in which said handle members are connected to the respective left-hand and right-hand elongated cam arms on opposite sides thereof.

9. A setting tool for animal traps having a pair of jaws pivotally mounted on a base frame for movement between an open set position and a closed position, and spring-loaded jaw actuating levers biasing said jaws toward the closed position; said setting tool being adapted to engage and depress the actuating levers against the spring-loading force thereon to accommodate setting the jaws in their open position, said setting tool comprising a trap orienting base for central engagement with the animal trap and having flange means forming a central fulcrum, a pair of unitary cam levers including inner cam arms having adjacent ends pivotally connected together on said central fulcrum and outer cam hook members rigidly connected to said cam arms outwardly of said adjacent ends thereof, said cam hook members having leg sections extending upwardly from said cam arms at a predetermined angle and actuating lever engaging means rigidly connected at the upper ends of said leg sections, and handle means connected to said cam arms between said adjacent ends thereof and said cam hook members.

10. An animal trap setting tool adapted for use in combination with an animal trap having longitudinal and centrally transversely crossed base frame members, a pair of jaws pivotally mounted on the longitudinal frame member for movement between a lower, substantially horizontal, open set position and an upper, substantially vertical, closed position, and spring-loaded jaw actuating levers acting on the jaws and having a depressed lower position in the set position of the jaws and an angular upper position in the closed position of the jaws; said setting tool comprising a trap orienting base having centering means for central engagement with the crossed frame members of the animal trap to retain said setting tool against displacement therefrom and flange means forming a central fulcrum, a pair of cam levers extending oppositely outwardly from said central fulcrum and including elongated inner cam arm members having adjacent ends pivotally connected together on said central fulcrum and outer cam hook members having lower ends rigidly.-connected-. to the outer ends of said cam arm members, said cam hook members having elongated leg sections extending upwardly from said cam arm members and having actuating lever engaging means connected at the upper ends of said leg sections, and handle means rigidly connected to said cam arm means intermediate to said inner and outer ends thereof.

11. The setting tool according to claim 10, in which said leg sections of said cam hook members are disposed at a predetermined angle to said cam arm members and have a preselected length to locate the actuating lever engaging means in operative engagement with the jaw actuating levers of the animal trap.

12. The setting tool according to claim 11 including spacer means for connecting said leg sections to said outer ends of said cam arm members to provide a transversely offset relationship therebetween, said spacer means extending substantially normal to said cam arm members and said leg sections.

13. The setting tool according to claim 12, in which said spacer means comprises relatively short connection rods formed integral with said leg sections and being permanently secured to said cam arm members.

14. The setting tool according to claim 12, in which said spacer means of each cam hook member comprises means for removably securing said cam hook member to said cam arm member whereby cam hook members having leg sections of different lengths may be selectively connected onto said setting tool for setting operations on different sized animal traps.

15. The setting tool according to claim 14, in which said spacer means of each cam hook member comprises a relatively short connection rod having a free end portion, and said removable securing means comprises an opening formed in said outer end of said cam arm member for receiving said free end portion therein, keying means between said opening and said free end portion to prevent relative rotation between said cam arm and cam hook members due to torque forces occurring on the use of said setting tool, and fastening means for securing said free end portion to said cam arm member.

16. The setting tool according to claim 15, in which said keying means comprises a flat edge margin formed on said cam arm opening, and said free end portion having a flat area thereon and being of complementary cross-section to said opening, and abutment means on said connection rod adjacent to said free end portion for surface engagement with said cam arm member adjacent to said opening therethrough.

17. The setting tool according to claim 15, in which said removable securing means further comprises abutment means on said connection rod for positioning said free end portion to extend through said opening, and said fastening means comprises a thread formed on said free end portion and a threaded nut for securing said abutment means against said cam arm member.

18. The setting tool according to claim 12, in which said spacer means comprises a pair of spacer members secured in opposed relation to said outer end of said cam arm member and said lower end of said cam hook member respectively, the opposed free surfaces of said spacer members being notched to form interlocking teeth, and means for releasably securing said spacer members together to provide a selected angular relationship between said cam arm and cam hook members.

* * * * *

UNITED STATES PATENT OFFICE
CERTIFICATE OF CORRECTION

Patent No. 4,807,389

Dated February 28, 1989

Inventor(s) Elmer D. Scherrinsky

It is certified that error appears in the above-identified patent and that said Letters Patent is hereby corrected as shown below:

Column 1, line 35, after "setting tool" insert --having--.
Column 3, line 7, "S6" should be --36--.
Column 5, line 26, "S45" should be --345--.
Column 6, line 28 (claim 6), "each" should be --said--.
Column 8, line 15 (claim 15), "on" should be --in--.

Signed and Sealed this

Fifteenth Day of August, 1989

Attest:

DONALD J. QUIGG

Attesting Officer

Commissioner of Patents and Trademarks